United States Patent
Della Vedova et al.

(10) Patent No.: US 8,902,949 B2
(45) Date of Patent: Dec. 2, 2014

(54) METHOD TO CONTROL THE FEED OF THE METAL CHARGE FOR ELECTRIC ARC FURNACES

(75) Inventors: Ferruccio Della Vedova, Pozzuolo del Friuli (IT); Marco Ometto, Pasian di Prato (IT)

(73) Assignee: Danieli Automation SpA, Buttrio (UD) (IT)

( * ) Notice: Subject to any disclaimer, the term of this patent is extended or adjusted under 35 U.S.C. 154(b) by 1823 days.

(21) Appl. No.: 12/109,495

(22) Filed: Apr. 25, 2008

(65) Prior Publication Data

US 2008/0267249 A1    Oct. 30, 2008

(30) Foreign Application Priority Data

Apr. 26, 2007   (IT) .............................. UD2007A0075

(51) Int. Cl.
| | |
|---|---|
| F27D 3/00 | (2006.01) |
| C21C 5/52 | (2006.01) |
| F27D 19/00 | (2006.01) |
| F27B 3/28 | (2006.01) |
| F27B 3/18 | (2006.01) |
| C22B 4/08 | (2006.01) |

(52) U.S. Cl.
CPC . *F27B 3/18* (2013.01); *C21C 5/527* (2013.01); *F27D 19/00* (2013.01); *F27B 3/28* (2013.01); *C22B 4/08* (2013.01); *C21C 2005/5288* (2013.01)
USPC .............................................. 373/79; 373/81

(58) Field of Classification Search
USPC ............. 373/2, 60, 62, 64, 79, 80, 81, 85, 50, 373/104, 82; 75/10.35; 266/79, 94, 85, 86, 266/99, 216
See application file for complete search history.

(56) References Cited

U.S. PATENT DOCUMENTS

2002/0083794 A1 *  7/2002  Berger et al. ................ 75/10.35

FOREIGN PATENT DOCUMENTS

| | | |
|---|---|---|
| DE | 36 16 344 A1 | 11/1987 |
| DE | 196 08 530 A1 | 8/1997 |
| GB | 2 088 904 A | 6/1982 |
| JP | 07 166222 A | 6/1995 |
| WO | WO 2007/009924 A1 * | 1/2007 |

OTHER PUBLICATIONS

English translation of Rieger et al., WO 2007/009924 A1, Jan. 2007.*
The 28th AIM National Conference, Italian Metallurgy Association, vol. 1, Nov. 8, 2000, 15 pages.

(Continued)

*Primary Examiner* — Dana Ross
*Assistant Examiner* — Hung D Nguyen
(74) *Attorney, Agent, or Firm* — Panitch Schwarze Belisario & Nadel LLP

(57) ABSTRACT

A method is provided to control the feed of a metal charge into an electric arc furnace having at least one electrode to generate an electric arc to melt metals. The method includes: a step of defining a "cover index CI" of the electric arc by the slag present above the liquid metal bath, in order to calculate which of the harmonics present in an electric feed quantity of the furnace are taken into consideration; a step of measuring the actual cover index CI value during a functioning cycle of the furnace; and a step of adjusting the speed of feed of the metal charge into the furnace based on the measured value of the cover index CI.

8 Claims, 2 Drawing Sheets

(56) References Cited

OTHER PUBLICATIONS

Argenta, P. et al., Techint Technologies, "The Consteel® Process: State of the Art and Future Developments", 11 pages.

Ori Martin Acciaieria S.p.A. Brescia, "Digital Electrode Regulation (TDR) with System for Harmonic Analysis and Active Power Control," Sep. 9, 1999, 16 pages.

Ori Martin Acciaieria S.p.A. Brescia, "For the Delivery of a Digital Electrode Regulation (TDR) with System for Harmonic Control and Active Power Control," Sep. 17, 1999, 9 pages.

Seminar associacao brasileira de metais, "Steelworks and Electric Furnaces," Dec. 11, 1991, pp. 89-97.

Norma Italiana CEI, "Electromagnetic compatilbility (EMC) Part 2-2: Environment—Compatibility levels for low-frequency conducted disturbances and signalling in public low-voltage power supply systems," CEI EN 61000-2-2, (Jun. 2003), 45 pages.

IEEE Recommended Practices and Requirements for Harmonic Control in Electrical Power Systems, 2 pages.

Bollen, M. et al., "Signal Processing of Power Quality Disturbances," Institute of Electrical and Electronics, Copyright © (2006) 4 pages.

De Miranda, et al., Techint Technologies, "Saving energy and protecting the environment: the first Consteel® plant in Europe," Jun. 1999, 8 pages.

Notice of Opposition to a European Patent and Statement of Grounds of Opposition to EP Patent No. 1985952, dated Jan. 21, 2011, 32 pages.

\* cited by examiner

METHOD TO CONTROL THE FEED OF THE METAL CHARGE FOR ELECTRIC ARC FURNACES

BACKGROUND OF THE INVENTION

The present invention concerns a method to control the feed of the metal charge, in particular scrap or the like, for electric arc furnaces.

More particularly, the invention concerns a method to control the times of feed of the metal charge into an electric arc furnace, which allows reduction of disturbances and perturbations, mainly of the electric type, while at the same time maximizing the charge speed and hence the overall productivity of the furnace.

The invention is applied particularly, but not exclusively, for systems to feed scrap with a continuous charge, although its use is not excluded for systems of intermittent feed, for example of the type with baskets.

In an electric arc furnace for melting metal, the scrap can be fed either intermittently, for example with baskets that load rhythmically with a pre-determined timing, correlated to the duration of the melting cycle, or continuously, normally by a conveyor belt having its outlet end connected with the inside of the furnace.

It is known that, in order to increase the productivity of the furnace, one aims to have a loading speed of the scrap that is as high as possible, in order to obtain the maximum quantity of molten metal in the shortest time possible.

It is also known that every loading of the scrap inside the furnace determines a negative effect on the extent to which the electric arc is covered by the foamy slag, which covers the bath of liquid metal.

In other words, the scrap loaded has a disruptive effect on the level of cover that the slag exerts on the electric arc. This means that, in the case of only a partial cover of the arc, or even no cover at all, a smaller or larger part of the energy irradiated by the arc is dispersed toward the walls and the roof of the furnace, which causes a loss of energy efficiency of the furnace.

In these cases, when a reduction is noticed in the degree of cover of the electric arc, the introduction of the scrap is interrupted, or at least slowed down, in order to allow restoration of a state of quiet inside the furnace, which allows a return to an acceptable level of cover of the electric arc.

However, at present the verification of the state of cover of the electric arc is entrusted to empirical or simply visual techniques, which are not reliable, and which to a large extent depend on the experience and skill of the operators. All of this can cause, on the one hand, unnecessary reductions in the speed of feed, if it is desired to guarantee that a high energy efficiency is maintained; and, on the other hand, reductions in energy efficiency, if it is desired in any case to maintain a high speed of loading the scrap into the furnace.

BRIEF SUMMARY OF THE INVENTION

A purpose of the present invention is therefore to obtain a method to control the feed of the metal charge into an electric arc furnace which may guarantee a reliable, standardized, repeatable, and objective control of the conditions of cover of the electric arc, in order to condition the speed of loading the scrap into the furnace, thus maximizing productive efficiency.

The Applicant has devised, tested and embodied the present invention to achieve this purpose, and other advantages. According to the invention, a method is provided for controlling the feed of a metal charge into an electric arc furnace. The furnace includes at least one electrode able to generate an electric arc to melt metals to form a liquid bath.

According to one embodiment, the method comprises the following steps:

defining a "cover index CI" of the electric arc by the slag present above the liquid bath, wherein, in order to calculate the cover index (CI), the harmonics present in an electric feed quantity of the furnace are taken into consideration;

measuring the actual cover index (CI) value during a functioning cycle of the furnace; and adjusting the speed of feed of the metal charge into the furnace based on the measured value of the cover index (CI)

According to one embodiment of the invention, the Applicant has found that the level of cover of the electric arc in a melting furnace is correlated to the trend of the fluctuations of the electric feed quantities of the furnace, in particular the voltage.

More particularly, it has been found, surprisingly, that the degree of cover of the electric arc is closely correlated to the harmonic content of the feed voltage, and in particular the number of even harmonics present in the voltage signal.

The method according to the invention therefore defines, first of all, a "cover index." To calculate this, the harmonics present in the feed voltage are taken into consideration and, according to a preferred embodiment, only the even harmonics present in the feed voltage are taken into consideration.

In the method according to another embodiment the invention, two thresholds are defined, respectively lower and upper, defining limit values corresponding respectively to a condition where the electric arc is covered, when the cover index is below the minimum threshold, and a condition of no cover, when the index is above the maximum threshold.

When the cover index, measured continuously or at intervals, during a functioning cycle of the furnace, goes below the minimum threshold, the speed of feed of the metal charge is increased. In contrast, if the index goes above the maximum threshold, the speed of feed is reduced.

In particular, an evolved form of the invention provides that, if the cover index remains below the minimum threshold for a pre-determined time, even after a first increase in speed, the speed is further increased, for example by a pre-determined value and at pre-established intervals.

In contrast, if the cover index is above the maximum threshold, the speed is progressively reduced, for example with successive reductions by a pre-established value, until the value falls at least within the interval defined between the two thresholds.

According to one embodiment of the invention, when the cover index lies between the two thresholds, the speed of feed is maintained substantially constant at a pre-established working value.

The distance between the two thresholds can be chosen as desired and indicates a condition of sufficient cover to maintain a pre-set working speed.

With the present invention therefore, the speed of feed of the metal charge inside the furnace is always substantially the maximum speed allowed by the actual conditions of cover of the electric arc found inside the furnace, so that the overall productivity can be optimized in this way.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
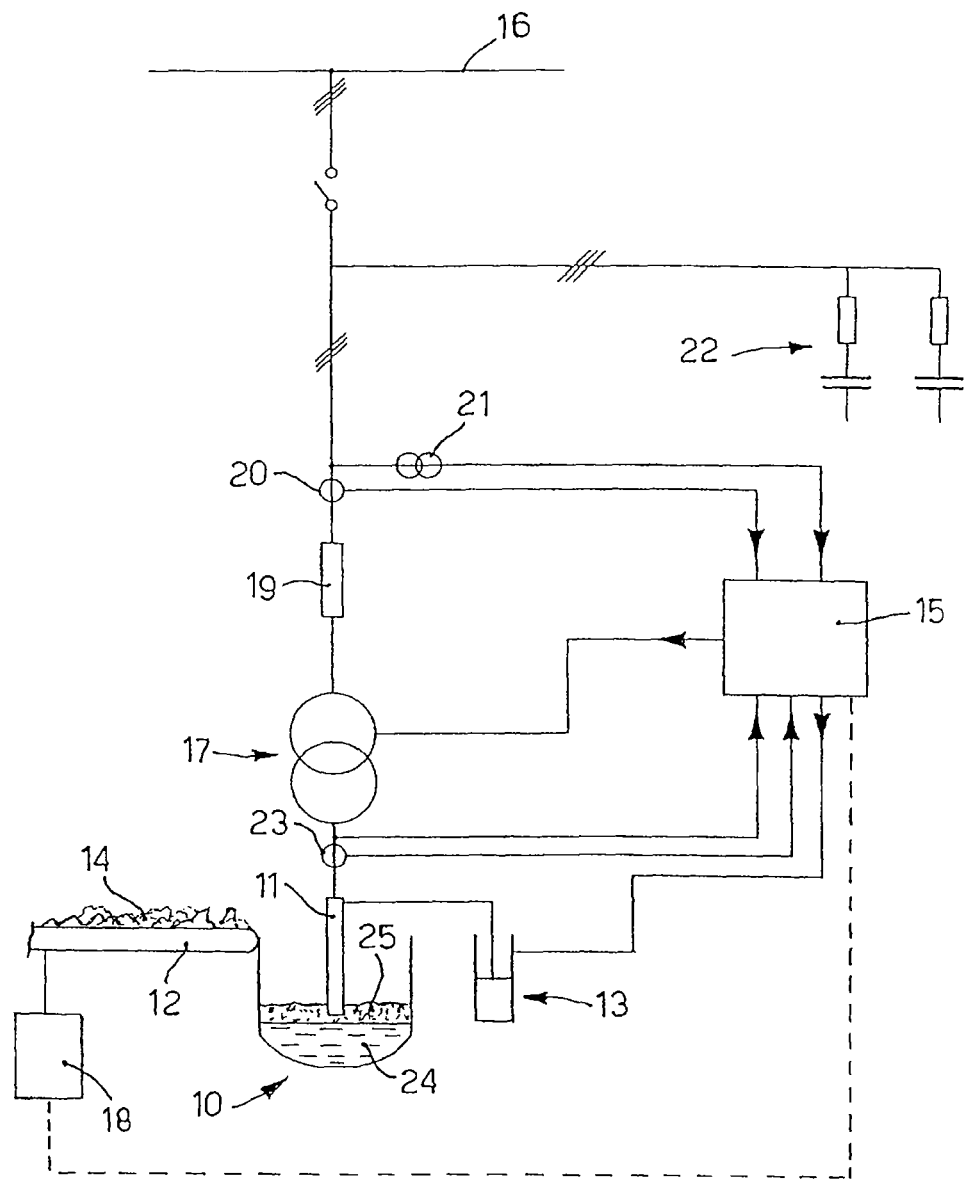
FIG. 1 is a schematic diagram of an electric furnace for melting metals, showing the electric feed system and the system to feed the metal charge.

Referring to FIG. 1, the reference number 10 denotes an electric arc furnace fed with alternating current, inside which the electrodes 11 are disposed (only one of which is shown in the drawings).

Although FIG. 1 refers to a furnace fed with alternating current, it is understood that the invention is also applicable to furnaces fed with direct current, with the appropriate adaptations that come within the knowledge of a person of ordinary skill in the art.

The upper electrodes 11 are controlled by a position control system 13, connected in feed back to a regulation unit 15, which manages the functioning of the furnace 10.

The electric power for the furnace is taken from a medium voltage feed line 16 and transformed by a suitable transformer 17.

Downstream of the feed line 16 there are measuring units 20 and 21, which send their signals to the control unit 15, whereby it is possible to control the profile of the power delivered to the furnace 10 through the electrodes 11.

Moreover, downstream of the transformer 17 there is another measuring unit 23, which is suitable for transmitting to the control unit 15 the information relating to the electric quantities, for example power, voltage and current, supplied to the electrodes 11.

An inductor 19 is located upstream of the transformer 17, while there is a set of power factor correction condensers 22 in parallel with the line of feed.

The furnace 10 is associated, in the case schematically shown, with a continuous charge system comprising a conveyor belt 12 on which the scrap 14 is positioned.

The conveyor belt 12 can be associated, in a known manner, with a heating or maintenance tunnel, with fume suction and discharge means, and with other accessory systems not shown here, since they are irrelevant for an understanding of the invention.

The conveyor belt 12 advances at a speed determined by a drive system, schematically shown by the block 18 in FIG. 1, also connected in feedback to the control unit 15.

In this way, the control unit 15 regulates the loading speed of the scrap 14 into the furnace 10, according to the electric feed signals arriving from the various units present, and in particular from the measuring units 20, 21 and 23.

Inside the furnace 10 there is a bath of liquid metal, indicated by 24, above which there is a layer of foamy slag 25, which at least partly covers the electric arc that sparks between the lower end of the electrodes 11 and the bath of liquid metal 24.

Figure 2:
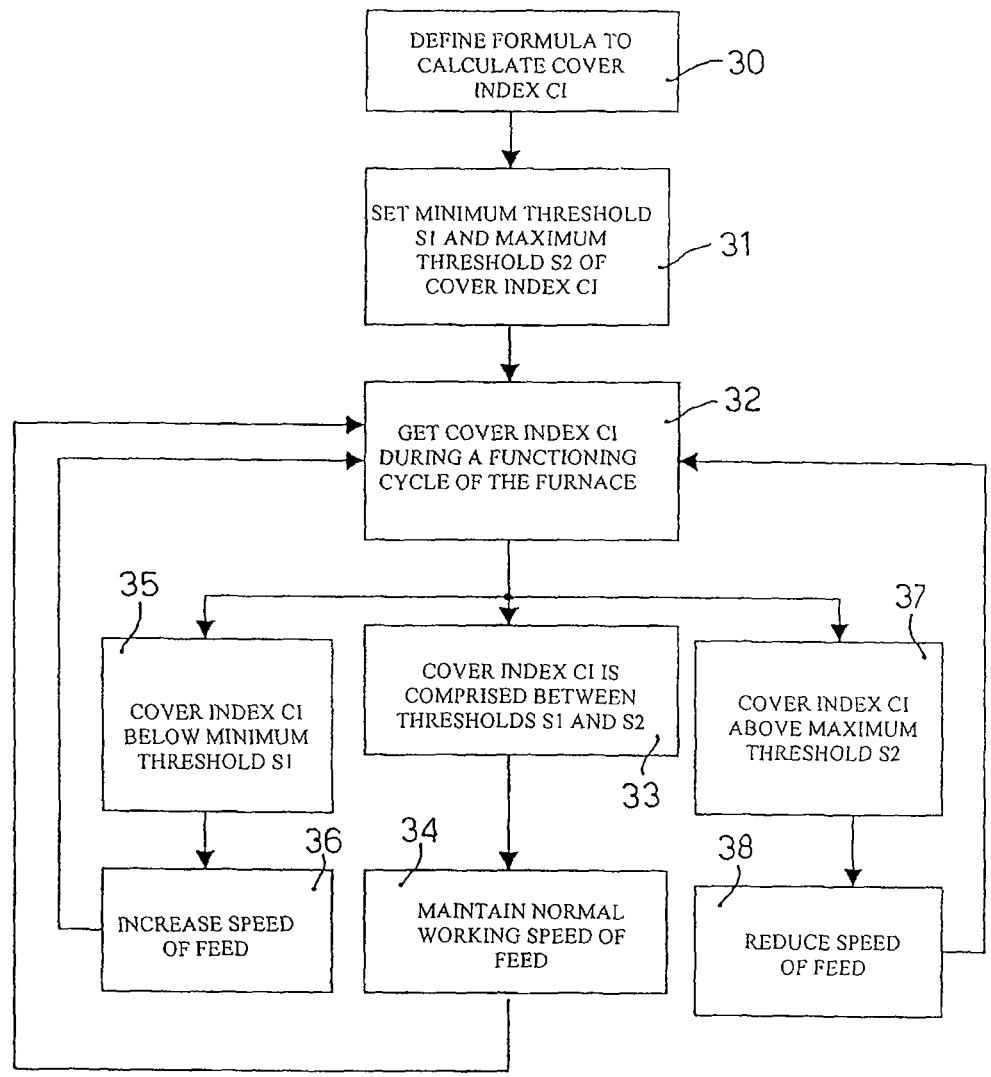
FIG. 2 is a block flow diagram of an embodiment of the method according to the invention.

According to an embodiment of the invention, as indicated by step 30 in FIG. 2, a cover index CI of the electric arc is defined, for the calculation of which the harmonics present in the feed voltage to the furnace 10 are taken into consideration, in particular the even harmonics.

A preferred embodiment of the invention provides that the cover index CI is defined by the following formula:

$$CI = K \frac{\sqrt{\sum_{i=1}^{n} H_{2i}^2}}{H_1}$$

where H represents the harmonic distortion of the i-th sinusoidal wave of the feed voltage of the furnace 10, and K is an adaptive coefficient used to amplify the signal.

As can be seen from the formula, the preferred solution provides that, to calculate the cover index CI only the even harmonics are taken into consideration. However, it falls within the scope of the invention that the odd harmonics are taken into consideration, or both the even and the odd harmonics.

Then, thresholds are defined (step 31), respectively S1 minimum and maximum, which indicate, respectively, a condition of cover when CI<S1, and a condition of no cover when CI>S2. In the case where S1<CI<S2, there is an acceptable condition of the cover index, which is considered as indicated hereafter.

When the functioning cycle of the furnace 10 is started, with a determinate tap-point (corresponding to a defined position of the electrodes 11 inside the furnace 10, defined by the system 13), and then the feed is started with a continuous charge of scrap 14, driving the conveyor belt 12, the actual CI is calculated, corresponding to a functioning step (step 32).

In the case where CI lies between S1 and S2 (block 33), the pre-set working speed is maintained (block 34), corresponding to the determinate tap-point and, after a determinate time interval, a new measurement of CI is made.

In the case where CI is less than the minimum threshold S1 (block 35), this is an indication of complete cover of the electric arc, and therefore enables an increase in the speed of feed (block 36).

The increase in speed can occur at pre-set intervals and with pre-set increases.

According to a variant, the increase can occur continuously with a pre-set inclination ramp until a new measurement of the CI determines a CI increase within the S1-S2 interval or even above S2.

In this case too, after every increase in speed, a new calculation of the CI can be made, in order to verify the disruptive effect caused by a greater loading speed of the scrap 14 inside the furnace 10.

In contrast, in the case (block 37) where the CI index calculated is above the maximum threshold S2, this means a low level of cover of the electric arc, and therefore the speed of feed of the charge is reduced (block 38).

In this case too, the reduction in speed can occur with decreases of fixed value and at fixed intervals, or continuously, and is in any case followed by new calculations of the CI value in order to verify a return to within the S1-S2 range allowed, in order to restore working speed, or to verify the CI value is below S1, in order to allow an increase in speed above working speed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for controlling a feed of a metal charge into an electric arc furnace, the furnace comprising at least one electrode able to generate an electric arc to melt metals and form a liquid bath, the method comprising the following steps:
    defining a cover index CI of the electric arc by slag present above the liquid bath, wherein, in order to calculate the cover index (CI), harmonics distortions (H) of the i-th sinusoidal wave present in an electric feed quantity of the furnace are taken into consideration, and K is an adaptive coefficient;
    calculating an actual cover index (CI) value during a functioning cycle of the furnace,
    wherein the cover index (CI) is defined by the following formulas:

$$CI = K \frac{\sqrt{\sum_{i=1}^{n} H_{2i}^2}}{H_1}$$

when only even harmonics are considered, $$CI = K \frac{\sqrt{\sum_{i=0}^{n} H_{2i+1}^2}}{H_1}$$

when only odd harmonics are considered, and $$CI = K \frac{\sqrt{\sum_{i=1}^{n} H_i^2}}{H_1}$$

when a combination of even and odd harmonics is considered;
    setting two thresholds, respectively lower (S1) and upper (S2), defining limit values corresponding respectively to a situation where the electric arc is covered, when said cover index (CI) is lower than said minimum threshold (S1), and a situation of no cover when the index (CI) is above said maximum threshold (S2); and
    adjusting a speed of feed of the metal charge into the furnace, as follows:
    (i) increasing the speed of feed of the metal charge into the furnace in the case where the calculated value of the cover index (CI) is lower than the minimum threshold (S1),
    (ii) maintaining the speed of feed of the metal charge into the furnace in the case where the calculated value of the cover index (CI) is between the thresholds (S1, S2), and
    (iii) reducing the speed of feed of the metal charge into the furnace in the case where the calculated value of the cover index (CI) is above said maximum threshold (S2).

2. The method according to claim 1, wherein for calculating the cover index (CI) only even harmonics of the electric feed quantity are taken into consideration.

3. The method according to claim 1, wherein the electric feed quantity of the furnace is a feed voltage.

4. The method according to claim 1, wherein increasing and/or reducing the speed of feed of the metal charge into the furnace occurs by constant increases/decreases at constant intervals.

5. The method according to claim 1, wherein increasing and/or reducing the speed of feed of the metal charge into the furnace occurs continuously with a pre-determined inclination ramp.

6. The method according to claim 1, wherein at least after every increase and/or reduction in the speed of feed of the metal charge into the furnace, a successive calculation of the cover index (CI) is made.

7. The method according to claim 1, wherein the step of calculating the actual cover index (CI) during a functioning cycle of the furnace is performed continuously.

8. The method according to claim 1, wherein the step of calculating the actual cover index (CI) during a functioning cycle of the furnace is performed at pre-set intervals.

* * * * *